(12) United States Patent
Yousefpor et al.

(10) Patent No.: US 11,163,399 B2
(45) Date of Patent: Nov. 2, 2021

(54) SPLIT SENSE LINES FOR NEGATIVE PIXEL CONPENSATION

(71) Applicant: Apple Inc., Cupertino, CA (US)

(72) Inventors: Marduke Yousefpor, San Jose, CA (US); Martin Paul Grunthaner, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/737,424

(22) Filed: Jun. 11, 2015

(65) Prior Publication Data

US 2015/0277664 A1 Oct. 1, 2015

Related U.S. Application Data

(63) Continuation of application No. 13/406,338, filed on Feb. 27, 2012, now Pat. No. 9,081,442.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/04166* (2019.05)

(58) Field of Classification Search
CPC .... G06F 3/044; G06F 3/0418; G06F 3/04164; G06F 3/04166; G09G 2310/0221
See application file for complete search history.

(56) References Cited

U.S. PATENT DOCUMENTS

| | | |
|---|---|---|
| 3,950,655 A | 4/1976 | McLennan et al. |
| 4,543,500 A * | 9/1985 | McAlexander, III ........................ G11C 11/404 257/E27.084 |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |

(Continued)

FOREIGN PATENT DOCUMENTS

| | | |
|---|---|---|
| CN | 101673164 A | 3/2010 |
| CN | 102033651 A | 4/2011 |

(Continued)

OTHER PUBLICATIONS

European Search Report dated May 28, 2014, for EP Application No. 13156753.9, three pages.

(Continued)

*Primary Examiner* — Antonio Xavier
(74) *Attorney, Agent, or Firm* — Kubota & Basol LLP

(57) ABSTRACT

A touch panel configured to compensate for negative pixel effect is disclosed. The panel can be configured to increase a capacitive sense signal, indicative of a touching or hovering object, in order to compensate for an increase in negative capacitance when the object is poorly grounded. To perform the compensation, the panel can be configured to have split sense lines so as to increase the number of electric fringe fields forming the sense signal, thereby providing a sense signal that is substantially stronger than the negative capacitance signal. Each sense line can be split into two or more strips.

13 Claims, 7 Drawing Sheets

(56) References Cited

U.S. PATENT DOCUMENTS

| | | | |
|---|---|---|---|
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,279,187 B2 | 10/2012 | Geaghan | |
| 8,479,122 B2 | 7/2013 | Hotelling et al. | |
| 9,081,442 B2 | 7/2015 | Yousefpor et al. | |
| 2002/0140440 A1* | 10/2002 | Haase | G01R 27/2605 324/678 |
| 2004/0033664 A1* | 2/2004 | Park | H01L 27/1126 438/264 |
| 2005/0122119 A1 | 6/2005 | Barlow | |
| 2006/0026521 A1 | 2/2006 | Hotelling et al. | |
| 2006/0197753 A1 | 9/2006 | Hotelling | |
| 2006/0284972 A1* | 12/2006 | Aoki | G02F 1/136213 348/51 |
| 2007/0291016 A1* | 12/2007 | Philipp | G01D 5/2405 345/174 |
| 2008/0278178 A1* | 11/2008 | Philipp | G06F 3/044 324/662 |
| 2009/0273572 A1* | 11/2009 | Edwards | G06F 3/044 345/173 |
| 2010/0060608 A1 | 3/2010 | Yousefpor | |
| 2010/0073301 A1* | 3/2010 | Yousefpor | G06F 3/0446 345/173 |
| 2010/0110040 A1* | 5/2010 | Kim | G06F 3/0412 345/174 |
| 2010/0307840 A1* | 12/2010 | Kobayashi et al. | 178/18.06 |
| 2010/0328268 A1* | 12/2010 | Teranishi et al. | 345/175 |
| 2011/0006832 A1* | 1/2011 | Land | G06F 3/044 327/517 |
| 2011/0012840 A1* | 1/2011 | Hotelling | G06F 3/0418 345/173 |
| 2011/0057900 A1* | 3/2011 | Huang | G06F 3/044 345/174 |
| 2011/0074725 A1 | 3/2011 | Westerman et al. | |
| 2011/0102331 A1 | 5/2011 | Philipp | |
| 2011/0115718 A1 | 5/2011 | Hsieh et al. | |
| 2011/0175823 A1 | 7/2011 | Vieta | |
| 2011/0175834 A1* | 7/2011 | Han | G06F 3/044 345/173 |
| 2011/0247884 A1 | 10/2011 | Kim et al. | |
| 2011/0291977 A1 | 12/2011 | Moriwaki | |
| 2012/0026122 A1* | 2/2012 | Simmons | G06F 3/0418 345/174 |
| 2012/0044198 A1 | 2/2012 | Chai et al. | |
| 2012/0206403 A1* | 8/2012 | Wang | G02F 1/13338 345/174 |
| 2013/0057229 A1* | 3/2013 | Xie | H02M 1/4208 323/209 |
| 2013/0222324 A1* | 8/2013 | Yousefpor | G06F 3/0418 345/174 |

FOREIGN PATENT DOCUMENTS

| | | |
|---|---|---|
| CN | 102135827 A | 7/2011 |
| EP | 2 317 420 A1 | 5/2011 |
| JP | 07-129304 A | 5/1995 |
| JP | 2000-163031 A | 6/2000 |
| JP | 2002-342033 A | 11/2002 |
| TW | 200944877 A1 | 11/2009 |
| TW | 201015416 A1 | 4/2010 |
| TW | 201122959 A1 | 7/2011 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Sep. 12, 2014, for U.S. Appl. No. 13/406,338, filed Feb. 27, 2012, ten pages.

Notice of Allowance dated Jan. 9, 2015, for U.S. Appl. No. 13/406,338, filed Feb. 27, 2012, nine pages.

Notice of Allowance dated May 6, 2015, for U.S. Appl. No. 13/406,338, filed Feb. 27, 2012, five pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

CN Search Report completed Aug. 23, 2015, for CN Patent Application No. 201310128172.2, filed Feb. 25, 2013, four pages with English Translation, four pages.

TW Search Report completed Aug. 17, 2015, for TW Patent Application No. 102107076, filed Feb. 27, 2013, one page.

\* cited by examiner

SPLIT SENSE LINES FOR NEGATIVE PIXEL CONPENSATION

CROSS-REFERENCE TO RELATED APPLICATIONS

This application is a continuation application of U.S. patent application Ser. No. 13/406,338, filed Feb. 27, 2012, of which is hereby incorporated by reference in its entirety.

FIELD

This relates generally to a touch panel and more specifically to a touch panel configured to compensate for negative pixel effect.

BACKGROUND

Many types of input devices are presently available for performing operations in a computing system, such as buttons or keys, mice, trackballs, joysticks, touch sensor panels, touch screens and the like. Touch sensitive devices, such as touch screens, in particular, are becoming increasingly popular because of their ease and versatility of operation as well as their declining price. A touch sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch sensitive device can allow a user to perform various functions by touching or hovering over the touch panel using a finger, stylus or other object at a location often dictated by a user interface (UI) being displayed by the display device. In general, the touch sensitive device can recognize a touch or hover event and the position of the event on the touch panel, and the computing system can then interpret the event in accordance with the display appearing at the time of the event, and thereafter can perform one or more actions based on the event.

When the object touching or hovering over the touch sensor panel is poorly grounded, touch or hover signals indicative of a touch or hover event can be erroneous or otherwise distorted. The possibility of such erroneous or distorted signals can further increase when two or more simultaneous events occur at the touch panel.

SUMMARY

This relates to a touch panel configured to compensate for negative pixel effect in the panel due to poor grounding of a user or other object touching or hovering over the panel. The panel can be configured to include sense lines that are split lengthwise into multiple strips, thereby increasing sense signal capacitance (indicative of a touch or hover event) in the sense lines in order to compensate for negative pixel capacitance (indicative of the object's grounding condition) introduced into the sense lines by the poorly grounded user or object. The multiple strips can be coupled together at a distal end to transmit a composite sense signal capacitance for processing. Alternatively, the multiple strips can be separated at a distal end to transmit each strip's sense signal capacitance for processing. The ratio of the sense signal capacitance to the negative pixel capacitance can be maintained at a suitable level to compensate for the negative pixel effect. Negative pixel compensation in a touch panel can advantageously provide more accurate and faster touch or hover detection, as well as power savings, by not having to repeat measurements subject to poor grounding conditions. Additionally, the panel can more robustly adapt to various grounding conditions of a user or other object.

DETAILED DESCRIPTION

Figure 1:
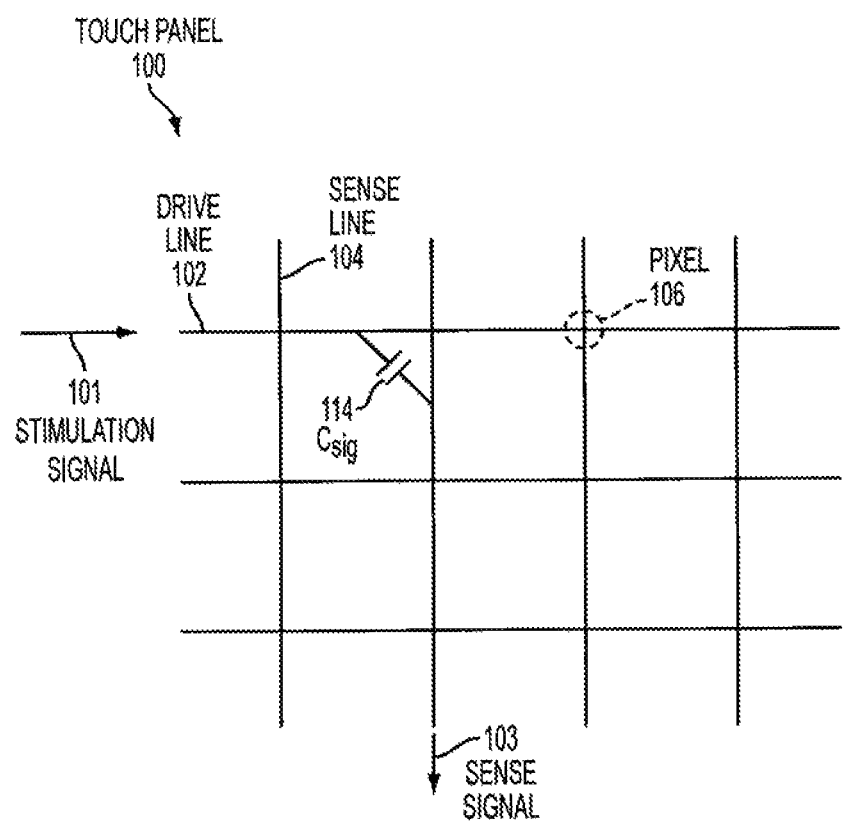
FIG. 1 illustrates an exemplary schematic of a touch panel according to various embodiments.

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to a touch panel configured to compensate for negative pixel effect in the panel due to poor grounding of a user or other object touching or hovering over the panel. Negative pixel effect refers to a condition in which an undesirable capacitance can be introduced into the panel to interfere with a touch or hover signal, causing the signal to be erroneous or otherwise distorted. The touch or hover signal can be generated as an indication of the proximity of the user or object to the panel at the same time that the poorly grounded user or object introduces the undesirable capacitance into the panel. To compensate for negative pixel effect, the panel can be configured to include sense lines that are split lengthwise into multiple strips, thereby increasing touch signal capacitance in the sense lines in order to compensate for negative pixel capacitance introduced into the sense lines by the poorly grounded user or object. In some embodiments, the multiple strips can be coupled together at a distal end to transmit a composite touch signal capacitance for processing. In some embodiments, the multiple strips can be separated at a distal end to transmit each strip's touch signal capacitance for processing.

The ratio of the touch signal capacitance to the negative pixel capacitance can be maintained at a suitable level to compensate for the negative pixel effect. Negative pixel compensation in a touch panel can advantageously provide more accurate and faster touch or hover detection, as well as power savings, by not having to repeat measurements subject to poor grounding conditions. Additionally, the panel can more robustly adapt to various grounding conditions of a user or other object.

The terms "poorly grounded," "ungrounded," "not grounded," "not well grounded," "improperly grounded," "isolated," and "floating" can be used interchangeably to refer to poor grounding conditions that can exist when an object is not making a low impedance electrical coupling to the ground of the touch panel.

The terms "grounded," "properly grounded," and "well grounded" can be used interchangeably to refer to good grounding conditions that can exist when an object is making a low impedance electrical coupling to the ground of the touch panel.

Although various embodiments can be described and illustrated herein in terms of mutual capacitance touch panels, it should be understood that the various embodiments are not so limited, but can be additionally applicable to self capacitance touch panels, both single and multi-touch touch panels, and other sensors in which stimulation signals can be used to generate a touch or hover signal.

FIG. 1 illustrates an exemplary schematic of a touch panel according to various embodiments. In the example of FIG. 1, touch panel 100 can include an array of pixels 106 formed at the crossing points of drive lines 102 and sense lines 104. Each pixel 106 can have an associated mutual capacitance Csig 114 formed between the crossing drive lines 102 and sense lines 104. The drive lines 102 can be stimulated by stimulation signals 101 provided by drive circuitry (not shown) and the sense lines 104 can transmit sense signals 103, indicative of an object touching or hovering over the panel 100, to sense circuitry (not shown) that can include a sense amplifier for each sense line.

When a well grounded user's finger (or other object) touches or hovers over the panel 100, the finger can cause the capacitance Csig 114 to reduce by an amount ΔCsig at the touch or hover location. This capacitance change ΔCsig can be caused by the finger blocking electric fringe fields formed between the stimulated drive line 102 and crossing sense line 104, thereby shunting charge or current from the drive line through the finger to ground rather than being coupled to the sense line at the touch or hover location. The sense signals 103 representative of the capacitance change ΔCsig can be transmitted by the sense lines 104 to the sense circuitry for processing. The sense signals 103 can indicate the pixel where the touch or hover occurred and the "amount" of touch or hover that occurred at that pixel location.

Conversely, when a poorly grounded user's finger (or other object) touches or hovers over the panel 100, a finger capacitance Cfd to the stimulated drive line 102, a finger capacitance Cfs to the crossing sense line 104 at the touch or hover location, and a finger capacitance Cgnd to ground can form a secondary capacitive path for coupling charge from the drive line to the sense line. Some of the charge generated by the stimulated drive line 102 and transmitted through the finger can be coupled via the secondary capacitive path back into the crossing sense line 104, rather than to ground. As a result, instead of the capacitance Csig 114 of the pixel at the touch or hover location being reduced by ΔCsig, Csig may only be reduced by (ΔCsig−Cneg), where Cneg can represent a so-called "negative capacitance" resulting from the charge coupled into the crossing sense line due to the finger's poor grounding. The sense signals 103 can still generally indicate the pixel where the touch or hover occurred but with an indication of a lesser amount of touch or hover than actually occurred. This is known as a negative pixel effect.

Figure 2:
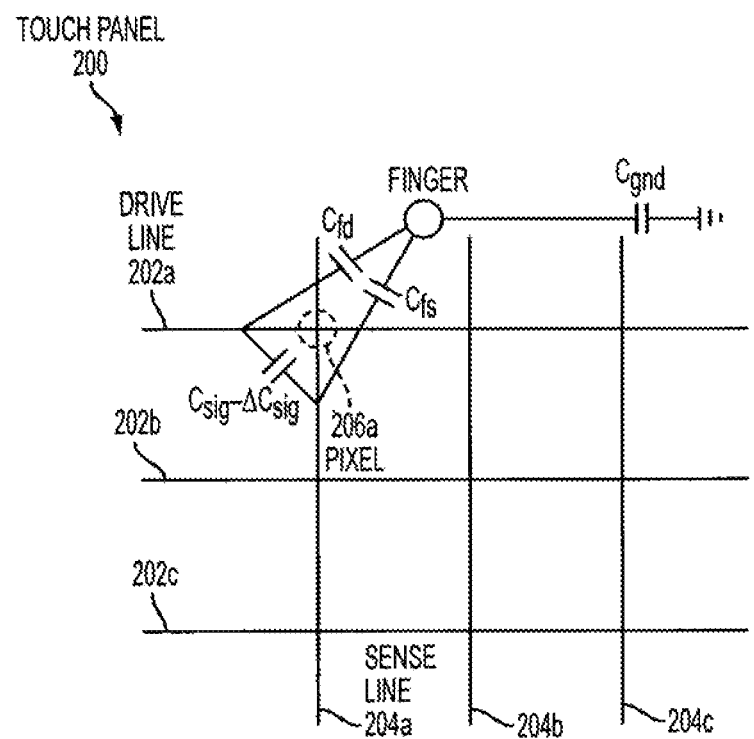
FIG. 2 illustrates an exemplary negative pixel effect in a touch panel receiving a touch from a poorly grounded finger according to various embodiments.

FIG. 2 illustrates an exemplary negative pixel effect in a touch panel receiving a touch from a poorly grounded finger according to various embodiments. In the example of FIG. 2, a poorly grounded finger (symbolically illustrated by a circle and identified as "finger") can touch at pixel 206a of touch panel 200. When drive line 202a of the panel 200 is stimulated, the capacitance along a first path between the drive line 202a and sense line 204a can be (Csig−ΔCsig). Because the finger is poorly grounded, a second capacitive path can form between the drive line 202a and the sense line 204a, having capacitances Cfd (between the drive line 202a and the finger) and Cfs (between the sense line 204a and the finger). A capacitance Cgnd can also form between the finger and ground. The capacitances Cfd, Cfs, forming negative capacitance Cneg, can be due to charge or current acquired by the finger from the stimulated drive line 202a being coupled back into the panel 200 at pixel 206a, rather than being shunted to ground. Hence, rather than the sense signal 103 outputted from sense line 204a being a capacitance of (Csig−ΔCsig), the outputted signal can be erroneous at a capacitance of (Csig−ΔCsig+Cneg) as a result of this negative pixel effect.

The negative pixel effect can be further exacerbated by multiple poorly grounded user's fingers (or other objects) simultaneously touching or hovering over the panel 200 at different locations. Erroneous sense signals 103 like that described previously can be outputted at the touch or hover locations. Additionally, phantom sense signals can be outputted at locations where there is no touch or hover (e.g., at sense lines 204b, 204c).

The impact of the negative pixel effect can be a function of the proximity of the poorly grounded object to the touch panel. Because capacitance is inversely proportional to distance, the closer the poorly grounded object to the touch panel, the stronger the negative capacitance and, hence, the negative pixel effect. This can be a particular concern as touch sensitive devices become thinner, making the distance between the touching or hovering object and the touch panel closer.

Figure 3:
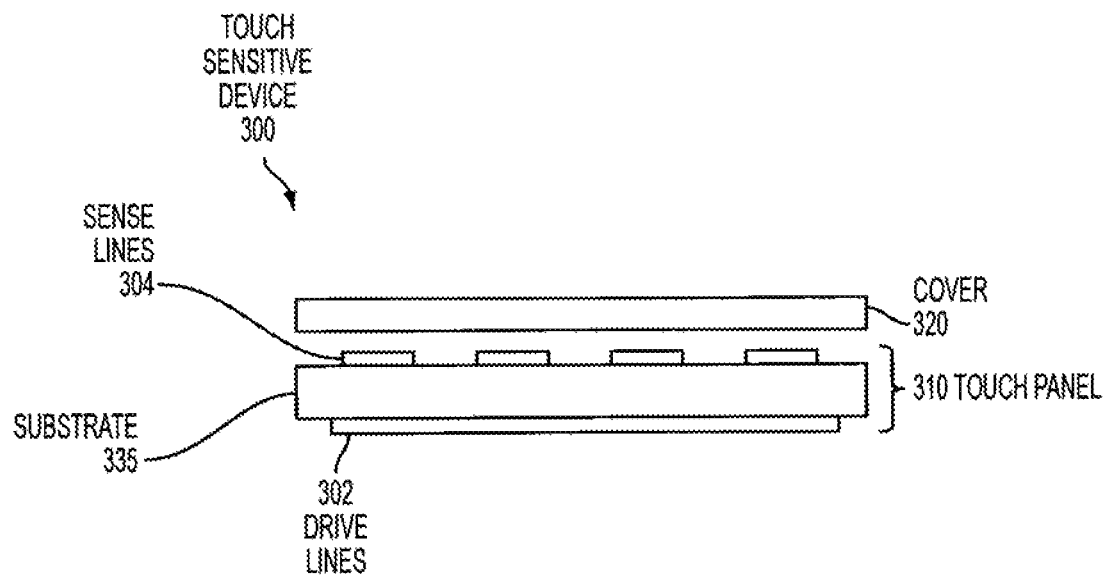
FIG. 3 illustrates an exemplary touch sensitive device according to various embodiments.

FIG. 3 illustrates an exemplary touch sensitive device according to various embodiments. In the example of FIG. 3, touch sensitive device 300 can include thin cover 320 disposed over touch panel 310. The cover 320 can be made of glass, polymer, or some other suitable material. The panel 310 can include sense lines 304, drive lines 302, and substrate 335 to support the drive and sense lines. A user can touch or hover over a touchable surface of the cover 320 and the panel 310 can detect the touching or hovering user. In some embodiments, the cover 320 can be quite thin, shortening the distance between the user and the panel 310. As a result, when the user is poorly grounded, the negative pixel effect can be more impactful on sense signals generated by the panel 310.

Therefore, compensating the sense signals for the negative pixel effect in a thinner touch sensitive device can improve touch or hover sensing of the device's touch panel in poor grounding conditions.

According to various embodiments, to compensate for the stronger negative pixel effect, the amount of the capacitance change ΔCsig can be likewise increased. That is, by increasing the amount of ΔCsig with the increased negative capacitances Cfd, Cfs, the ratio of ΔCsig to Cfd, Cfs can remain approximately the same as in normal operation (i.e., when the proximate object is well grounded), thereby attenuating the negative pixel effect of the increased Cfd, Cfs. The ratio is shown in the following Equation.

$$\frac{\Delta Csig}{\left(\frac{Cfd \times Cfs}{Cfd + Cfs + Cgnd}\right)}.$$

During normal operation, the ratio can have a value in which the numerator of ΔCsig is considerably larger than the denominator of negative capacitances such that the sense signal, indicated by ΔCsig, is easily detected. In some embodiments, the numerator can be at least 60% larger than the denominator. To work effectively during poorly-grounded operation, the touch panel can be configured to increase ΔCsig so as to maintain approximately the same ratio with the denominator.

Accordingly, ΔCsig can be increased by increasing the number of sense lines in a touch panel, thereby providing more sense line edges around which to form more electric fringe fields. As a result, there are more fringe fields with which the touching or hovering object can interfere and/or block. The more fringe field interference or blocking by the object, the greater ΔCsig.

As an object gets closer to the panel, both ΔCsig and the negative capacitance can dynamically increase because of the inverse relationship between capacitance and distance. That is, the closer the capacitive objects, the stronger the capacitance therebetween. However, because of the multiple sense line strips, the ratio between ΔCsig and the negative capacitance can be maintained (as illustrated in the previous Equation), such that ΔCsig is substantially larger than the negative capacitance. As a result, a touch panel having multiple sense line strips according to various embodiments can successfully compensate for the negative pixel effect regardless of the proximity of a poorly grounded object to the panel. Moreover, the panel can successfully compensate for various grounding conditions.

Figure 4:
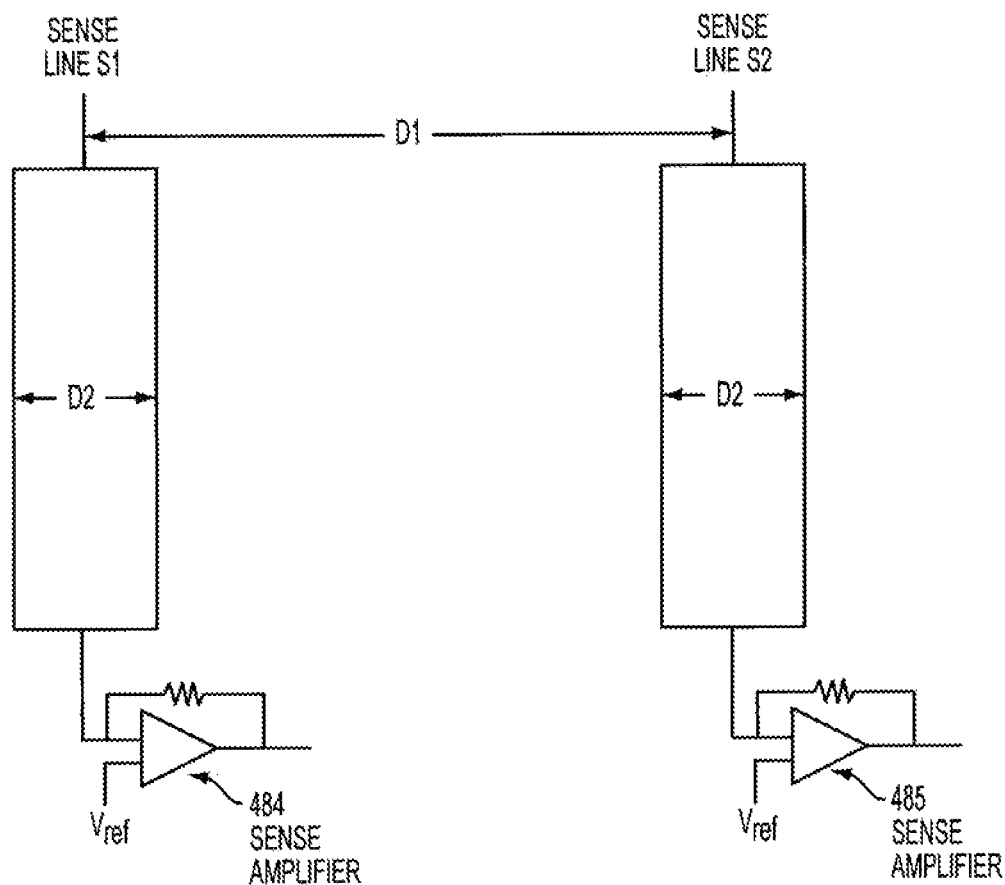
FIG. 4 illustrates an exemplary sense line configuration in a touch panel according to various embodiments.

FIG. 4 illustrates an exemplary configuration of sense lines in a touch panel according to various embodiments. In the example of FIG. 4, sense lines S1, S2 can form a typical configuration in which each sense line is a single line, rather than being split into multiple strips. Each sense line S1, S2 can have a width D2 and be connected to respective sense amplifiers 484, 485 for processing sense signals. The sense lines can be separated by distance D1. This typical configuration can be more susceptible to the negative pixel effect when placed in a thinner touch sensitive device. This is because the number of sense lines may be insufficient to produce a ΔCsig large enough to compensate for negative capacitance caused by a poorly grounded proximate object.

Figure 5:
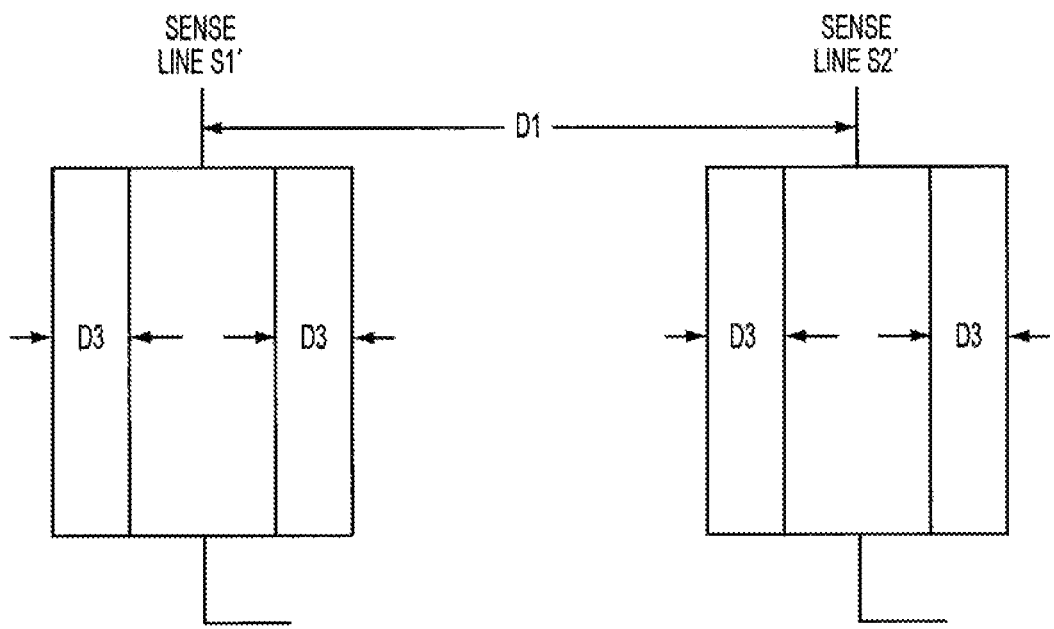
FIG. 5 illustrates an exemplary split sense line configuration in a touch panel according to various embodiments.

FIG. 5 illustrates an exemplary configuration of sense lines that can compensate for the negative pixel effect that may be found in the typical configuration of FIG. 4. In the example of FIG. 5, sense line S1' can be split into multiple strips, thereby increasing the number of sense lines and the amount of ΔCsig so as to compensate for the negative pixel effect. The sense line S1' can be split into two strips, each strip having a width D3, where D3=½ (D2). Alternatively, the strips can have different widths, where the total width equals D2. The two strips can be coupled together at the distal ends and connected to sense amplifier 484 (not shown) for processing sense signals. Sense line S2' can be similarly divided into two strips coupled together at the distal ends and connected to sense amplifier 485 (not shown). The multiple strips in FIG. 5 can approximately double the electric fringe fields of the single sense lines in FIG. 4, thereby effectively doubling ΔCsig to compensate for the negative pixel effect when a poorly grounded object touches or hovers over the panel.

Because the area of the single sense lines S1, S2 in FIG. 4 is the same as the combined area of the respective multiple strips S1', S2' in FIG. 5 and capacitance is directly proportional to area, mutual capacitance Csig can be the same in FIGS. 4 and 5. For similar reasons, negative capacitances Cfd, Cfs can be the same in FIGS. 4 and 5. However, as described previously, because the multiple strips in FIG. 5 can provide more sense line edges around which to form more electric fringe fields with which the touching or hovering object can interfere or block than the single sense lines in FIG. 4, ΔCsig can increase. Accordingly, a poorly grounded touching or hovering object can more easily be detected and less adversely impacted by the negative pixel effect in a FIG. 5 configuration than a FIG. 4 configuration. This is the basis for the various embodiments.

Figure 6:
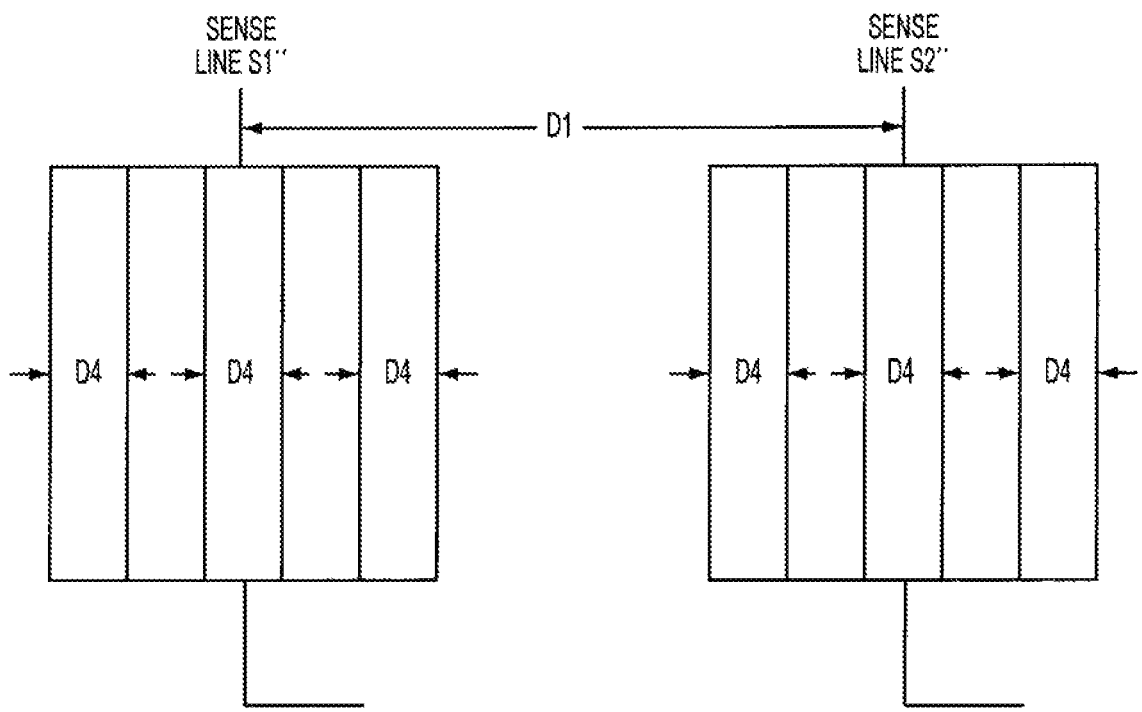
FIG. 6 illustrates another exemplary split sense line configuration in a touch panel according to various embodiments.

FIG. 6 illustrates another exemplary configuration of sense lines that can compensate for the negative pixel effect that may be found in the typical configuration of FIG. 4. In the example of FIG. 6, sense line S1' can be split into three strips, each strip having a width D4, where D4=⅓ (D2). Alternatively, the strips can have different widths. The three strips can be coupled together at the distal ends and connected at to sense amplifier 484 (not shown) for processing sense signals. Sense line S2" can be similarly configured. The multiple strips in FIG. 6 can approximately triple the electric fringe fields of the single sense lines in FIG. 4, thereby effectively tripling ΔCsig to compensate for the negative pixel effect when a poorly grounded object touches or hovers over the panel.

Figure 7:
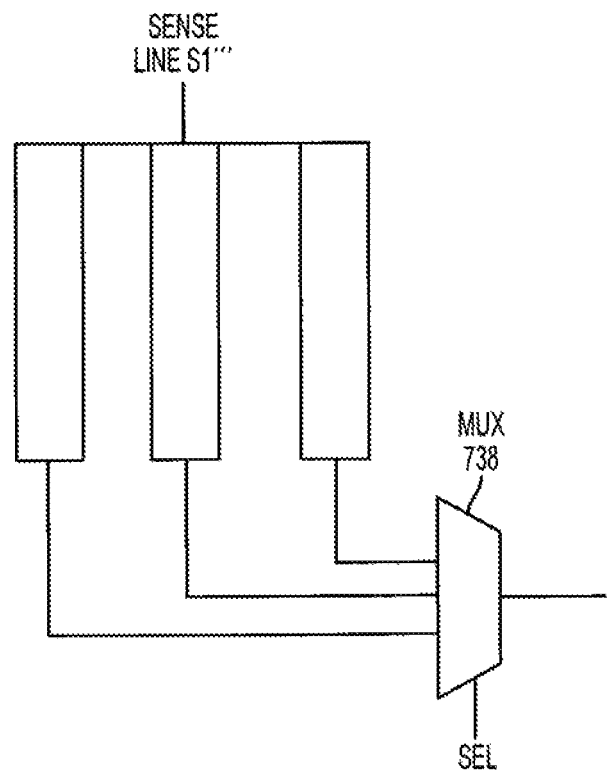
FIG. 7 illustrates still another exemplary split sense line configuration in a touch panel according to various embodiments.

FIG. 7 illustrates another exemplary configuration of sense lines that can compensate for the negative pixel effect that may be found in the typical configuration of FIG. 4. The example of FIG. 7 is similar to the example of FIG. 6 with the addition of multiplexer 738. In the example of FIG. 7, sense line S1''' can have the three strips coupled together at the top distal end and separate at the bottom distal end, where each strip can input to the multiplexer 738. The multiplexer 738 can then select (using control signal SEL) one of the strips to transmit sense signals to sense amplifier 484 (not shown) for processing.

Although FIGS. 5 through 7 show two or three strips, it is to be understood that a sense line can be split into any number of strips so as to compensate for negative pixel effect according to various embodiments.

Figure 8:
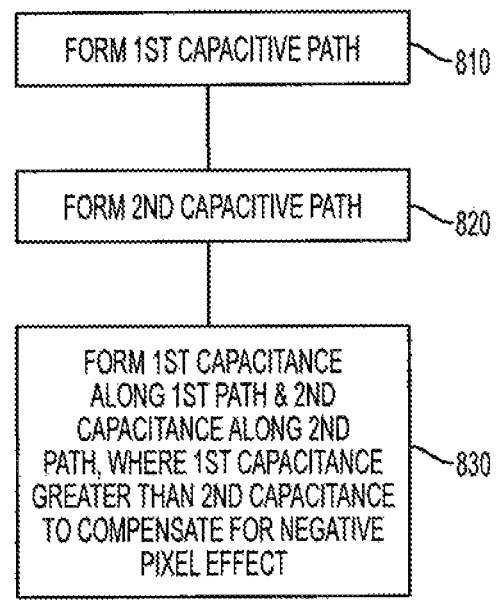
FIG. 8 illustrates an exemplary method for negative pixel compensation using a split sense line configuration in a touch panel according to various embodiments.

FIG. 8 illustrates an exemplary method to compensate for negative pixel effect in a touch panel according to various embodiments. In the example of FIG. 8, a first capacitive path can form between a drive line and multiple sense line strips of a touch panel (810). The capacitive path can have touch capacitance (Csig−ΔCsig), when a well grounded object touches or hovers over the panel. Alternatively, the capacitive path can have touch capacitance (Csig−ΔCsig+Cneg), when a poorly grounded object touches or hovers over the panel.

When a poorly grounded object touches or hovers over the panel, a second capacitive path can form between the drive line, the object, and the sense line strips (820). The capacitive path can have negative capacitance Cneg, which can include capacitance Cfd, formed between the drive line and the object, and capacitance Cfs, formed between the object and the sense line strips. When the object is well grounded, the second capacitive path may be negligibly weak.

Because ΔCsig increases in a configuration with multiple strips of sense lines, the ΔCsig increase can effectively counter the negative capacitance Cneg, thereby compensating for the negative pixel effect at the panel (830).

Figure 9:
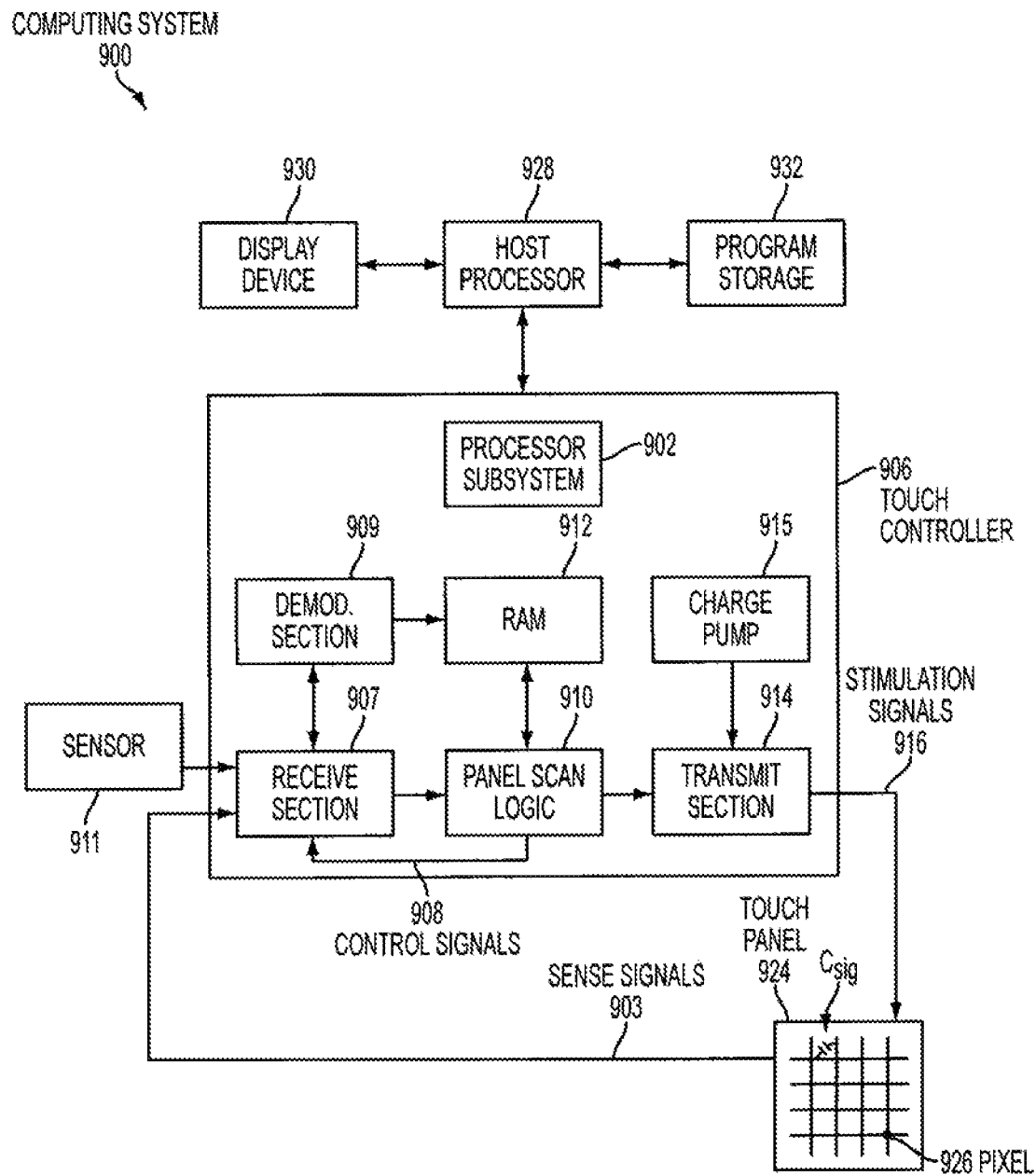
FIG. 9 illustrates an exemplary computing system that can include a touch panel with a split sense line configuration according to various embodiments.

FIG. 9 illustrates an exemplary computing system 900 that can have a touch panel configured to compensate for negative pixel effect according to various embodiments. In the example of FIG. 9, computing system 900 can include touch controller 906. The touch controller 906 can be a single application specific integrated circuit (ASIC) that can include one or more processor subsystems 902, which can include one or more main processors, such as ARM968 processors or other processors with similar functionality and capabilities. However, in other embodiments, the processor functionality can be implemented instead by dedicated logic, such as a state machine. The processor subsystems 902 can also include peripherals (not shown) such as random access memory (RAM) or other types of memory or storage, watchdog timers and the like. The touch controller 906 can also include receive section 907 for receiving signals, such as touch signals 903 of one or more sense channels (not shown), other signals from other sensors such as sensor 911, etc. The touch controller 906 can also include demodulation section 909 such as a multistage vector demodulation engine, panel scan logic 910, and transmit section 914 for transmitting stimulation signals 916 to touch sensor panel 924 to drive the panel. The panel scan logic 910 can access RAM 912, autonomously read data from the sense channels, and provide control for the sense channels. In addition, the panel scan logic 910 can control the transmit section 914 to generate the stimulation signals 916 at various frequencies and phases that can be selectively applied to rows of the touch sensor panel 924.

The touch controller 906 can also include charge pump 915, which can be used to generate the supply voltage for the transmit section 914. The stimulation signals 916 can have amplitudes higher than the maximum voltage by cascading two charge store devices, e.g., capacitors, together to form the charge pump 915. Therefore, the stimulus voltage can be higher (e.g., 6V) than the voltage level a single capacitor can handle (e.g., 3.6 V). Although FIG. 9 shows the charge pump 915 separate from the transmit section 914, the charge pump can be part of the transmit section.

Touch sensor panel 924 can include a capacitive sensing medium having drive lines and multiple strips of sense lines according to various embodiments. The drive and sense line strips can be formed from a transparent conductive medium such as Indium Tin Oxide (ITO) or Antimony Tin Oxide (ATO), although other transparent and non-transparent materials such as copper can also be used. The drive lines and sense line strips can be formed on a single side of a substantially transparent substrate separated by a substantially transparent dielectric material, on opposite sides of the substrate, on two separate substrates separated by the dielectric material, etc.

Computing system 900 can also include host processor 928 for receiving outputs from the processor subsystems 902 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 928 can also perform additional functions that may not be related to panel processing, and can be coupled to program storage 932 and display device 930 such as an LCD display for providing a UI to a user of the device. In some embodiments, the host processor 928 can be a separate component from the touch controller 906, as shown. In other embodiments, the host processor 928 can be included as part of the touch controller 906. In still other embodiments, the functions of the host processor 928 can be performed by the processor subsystem 902 and/or distributed among other components of the touch controller 906. The display device 930 together with the touch sensor panel 924, when located partially or entirely under the touch sensor panel or when integrated with the touch sensor panel, can form a touch sensitive device such as a touch screen.

Note that one or more of the functions described above can be performed, for example, by firmware stored in memory (e.g., one of the peripherals) and executed by the processor subsystem 902, or stored in the program storage 932 and executed by the host processor 928. The firmware can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any non-transitory medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any non-transitory medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the touch panel is not limited to touch, as described in FIG. 9, but can be a proximity panel or any other panel according to various embodiments. In addition, the touch sensor panel described herein can be either a single-touch or a multi-touch sensor panel.

It is further to be understood that the computing system is not limited to the components and configuration of FIG. 9, but can include other and/or additional components in various configurations capable of compensating for a negative pixel effect according to various embodiments.

Figure 10:
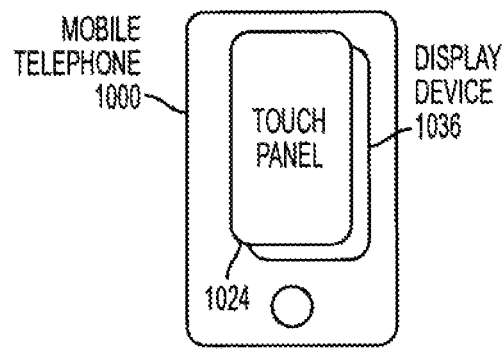
FIG. 10 illustrates an exemplary mobile telephone that can include a touch panel with a split sense line configuration according to various embodiments.

FIG. 10 illustrates an exemplary mobile telephone 1000 that can include touch sensor panel 1024, display 1036, and other computing system blocks, where the panel can be configured with multiple sense line strips to compensate for negative pixel effect according to various embodiments.

Figure 11:
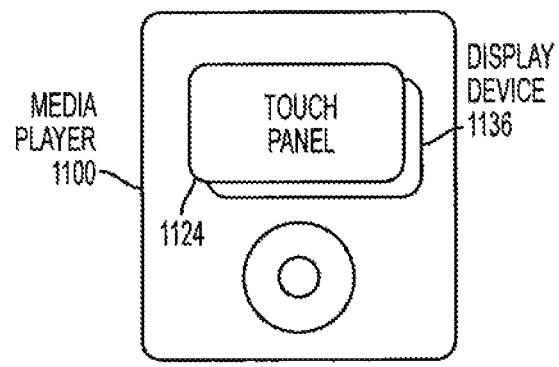
FIG. 11 illustrates an exemplary digital media player that can include a touch panel with a split sense line configuration according to various embodiments.

FIG. 11 illustrates an exemplary digital media player 1100 that can include touch sensor panel 1124, display 1136, and other computing system blocks, where the panel can be configured with multiple sense line strips to compensate for negative pixel effect according to various embodiments.

Figure 12:
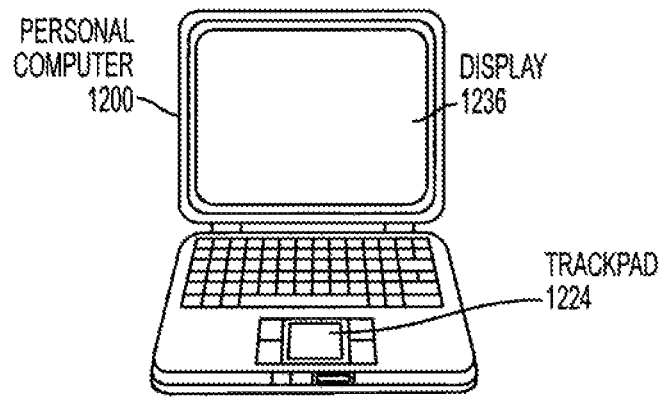
FIG. 12 illustrates an exemplary portable computer that can include a touch panel with a split sense line configuration according to various embodiments.

FIG. 12 illustrates an exemplary personal computer 1200 that can include touch sensor panel (trackpad) 1224, display 1236, and other computing system blocks, where the panel can be configured with multiple sense line strips to compensate for negative pixel effect according to various embodiments.

The mobile telephone, media player, and personal computer of FIGS. 10 through 12 can realize power savings, improved accuracy, faster speed, and more robustness by compensating for a negative pixel effect according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A touch panel comprising:
    a plurality of drive lines, each drive line configured to receive a separate stimulation signal and drive the touch panel to detect an object proximate to a surface of the touch panel; and
    a plurality of sense lines, each sense line divided into multiple directly adjacent and electrically separated strips continuously formed along their length and configured to increase a number of electric fringe fields formed between the stimulated drive lines and the sense lines and maintain at least a predetermined ratio between a change in mutual capacitance formed between a drive line and the sense line due to the proximate object, and a negative capacitance on the sense line due to the proximate object;
    wherein the change in mutual capacitance is greater than the negative capacitance.

2. The touch panel of claim 1, wherein the multiple strips of each sense line are connected to a same sense amplifier.

3. The touch panel of claim 1, wherein at least two of the connected strips of a single sense line are of different widths.

4. The touch panel of claim 1, wherein at least two of the strips of different sense lines are of different widths.

5. The touch panel of claim 1 comprising a multiplexer, wherein the strips of at least one of the sense lines are connected to the multiplexer.

6. The touch panel of claim 5, wherein the multiplexer is configured to select one of the strips to transmit sense signals to a sense amplifier.

7. The touch panel of claim 1, wherein each sense line is divided into at least three connected strips.

8. The touch panel of claim 1, comprising a touch controller configured to process sense signals received from the sense lines.

9. The touch panel of claim 1, wherein a first distance between the multiple strips of a sense line is different from a second distance between adjacent strips of different sense lines, and wherein the first distance is less than the second distance.

10. The touch panel of claim 9, wherein the first distance is a spacing between adjacent connected strips of a same sense line.

11. The touch panel of claim 1, wherein a width of each of strip a sense line of the plurality of sense lines is less than a distance between any two connected adjacent strips of the respective sense line.

12. The touch panel of claim 1, wherein a first distance between the multiple strips of a sense line is different from a second distance between adjacent strips of different sense lines, and wherein the second distance is greater than a total width of a sense line of the plurality of sense lines.

13. An electronic device including the touch panel of claim 1.

* * * * *

UNITED STATES PATENT AND TRADEMARK OFFICE
CERTIFICATE OF CORRECTION

PATENT NO. : 11,163,399 B2  
APPLICATION NO. : 14/737424  
DATED : November 2, 2021  
INVENTOR(S) : Marduke Yousefpor et al.

Page 1 of 1

It is certified that error appears in the above-identified patent and that said Letters Patent is hereby corrected as shown below:

On the Title Page

In item (54), Line 2, delete "CONPENSATION" and insert --COMPENSATION--.

In the Specification

In Column 1, Line 2, delete "CONPENSATION" and insert --COMPENSATION--.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*